Figure 1:
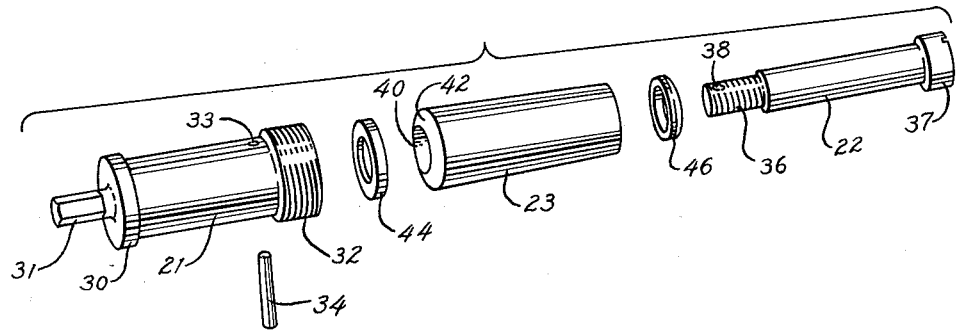

July 24, 1962  J. E. FERGUSON  3,045,785
DEVICE FOR CONNECTING PARTS TOGETHER
Filed Sept. 6, 1960  2 Sheets-Sheet 1

INVENTOR.
JOHN E. FERGUSON
BY
Lu R. Schermerhorn
Attorney

July 24, 1962   J. E. FERGUSON   3,045,785
DEVICE FOR CONNECTING PARTS TOGETHER
Filed Sept. 6, 1960   2 Sheets-Sheet 2

INVENTOR.
JOHN E. FERGUSON
BY
*C. R. Schermerhorn*
Attorney

United States Patent Office 3,045,785
Patented July 24, 1962

3,045,785
DEVICE FOR CONNECTING PARTS TOGETHER
John E. Ferguson, Beaverton, Oreg., assignor to Guy F. Atkinson Company, South San Francisco, Calif., a corporation of Nevada
Filed Sept. 6, 1960, Ser. No. 54,052
3 Claims. (Cl. 189—36)

This invention relates to means for connecting parts of an apparatus or structure together by a robot mechanism where conventional fastening means cannot be employed.

When two or more parts are to be secured together by a robot mechanism through remote control, certain problems exist which prevent the use of conventional fastening means. In the first place, it may be difficult or impossible to bring the two parts into sufficiently close register and alignment for the insertion of bolts and the like into closely fitting bolt holes. In the second place, even if an acceptable degree of register and alignment could be achieved, it is difficult to control the manipulations of a robot so as to obtain proper initial engagement of the threads of a bolt with the threads in a tapped hole or a nut, for example, without jamming or mutilating the threads. For similar reasons, other conventional fastening means are also unsuitable.

In order to be satisfactorily operable by a robot mechanism, the fastening device must itself assist in producing the final movements necessary to bring the parts into exact register and alignment, particularly where the parts are ponderous, flexible or subject to distortion and do not admit of precise placement of other means. Also, the problem of access to opposite sides of a part and the desirability of limiting the function of the robot to a single type of movement further complicates the application, tightening and removal of conventional fastening means under the conditions encountered. Further, the problem of picking up and manipulating separate fastening elements requires the fastening elements to be retained in positions where they are ready for use without complicated preliminary manipulations.

The general object of the invention is, therefore, to provide an improved fastening means for securing parts together, which can be operated by a robot mechanism.

Other objects are to provide fastening means of the type described which will assist in moving the parts into final register and alignment, to provide fastening means which can be manipulated entirely from one side of the work piece, to provide fastening means which can be both secured and released by a robot mechanism, to provide a plurality of fastening means which are held captive in one of the parts so that they may be conveniently operated by the robot mechanism and to provide a captive taper pin assembly as more particularly described in the following specification.

The present device is referred to as a captive taper pin assembly. Through a particular arrangement of a tapered sleeve on a bolt, the pin assembly is made captive in one of the parts and may be projected axially by a simple rotary movement applied by the robot mechanism. The tapered sleeve is provided with spherical end seats to make the device self-seeking and self-aligning while at the same time effective to pull the two parts together into proper relationship so that a considerable initial misalignment is tolerable. The tapered sleeve further enables the device to secure the parts together with the required rigidity but without a binding action that would tend to prevent release when desired.

The invention will be better understood and additional objects and advantages will become apparent from the following description of a preferred embodiment illustrated on the accompanying drawings. Various changes may be made, however, in the details of construction and arrangement of parts and all such modifications within the scope of the appended claims are included in the invention.

Figure 2:
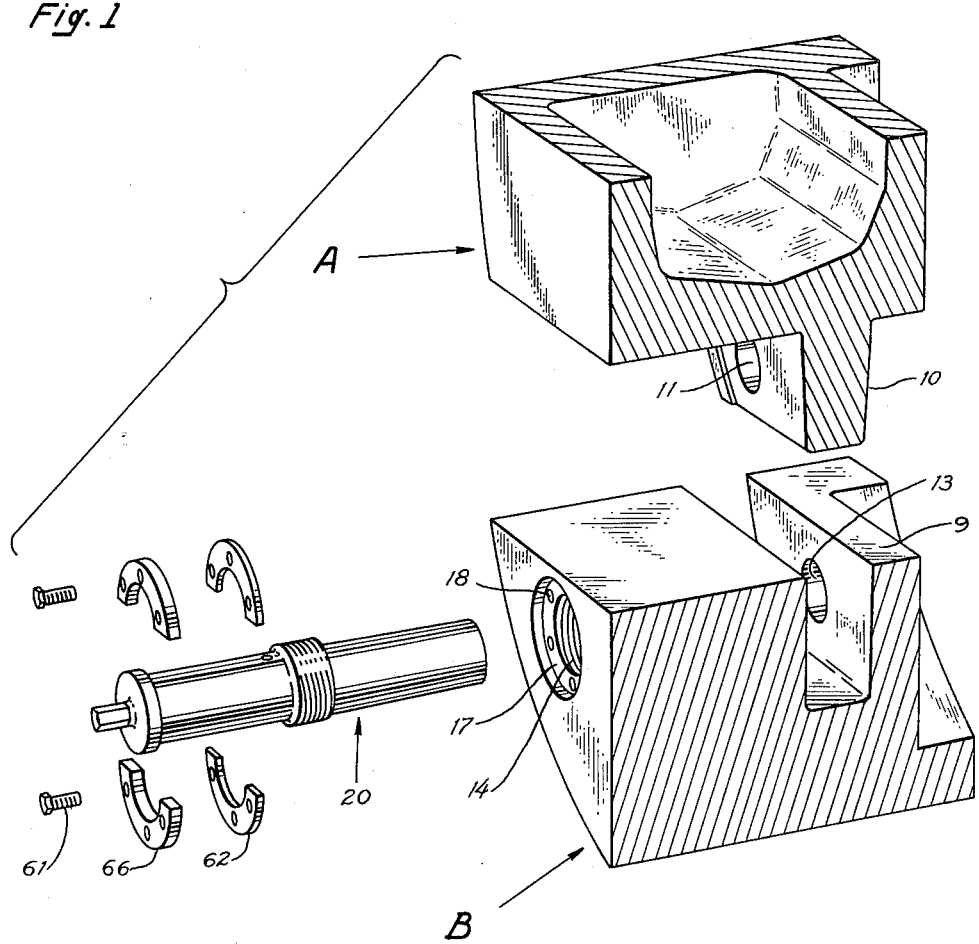
Figure 3:
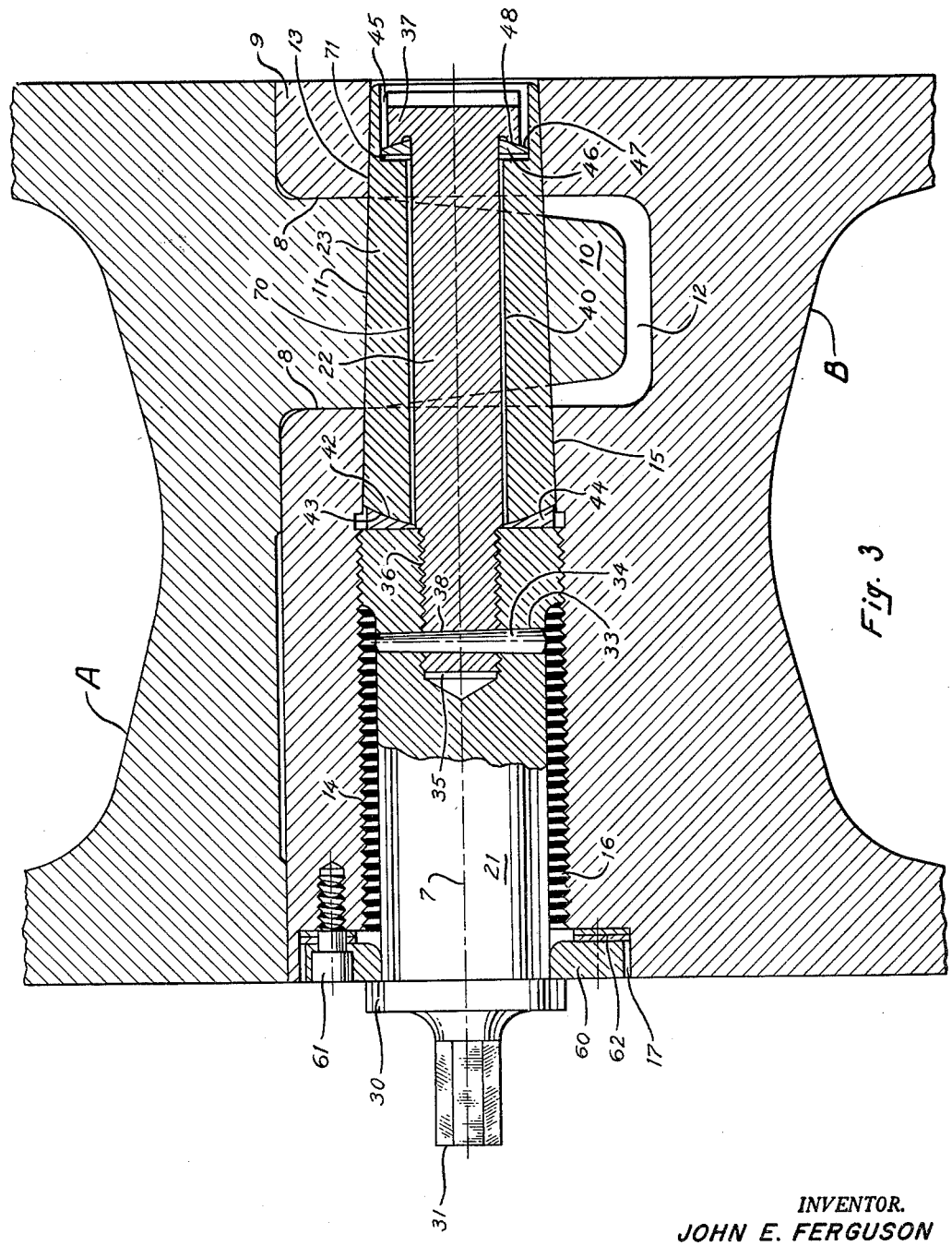

In the drawings:
FIGURE 1 is an exploded view in perspective of the captive taper pin assembly of the present invention;
FIGURE 2 is an exploded view in perspective showing fragmentary portions of two parts of an apparatus to be connected together by the taper pin assembly which is shown removed from one of the parts; and
FIGURE 3 is a sectional view showing the same parts fastened together.

The drawings illustrate a typical application where A designates the side beam of a large and ponderous apparatus which must be secured to a bottom ring segment B. For this purpose the part A is equipped with a tapered tongue or flange element 10 having a tapered hole 11. Part B is equipped with a mating slot or channel 12 having walls provided with aligned holes 13 and 14 having a common axis 7 shown in FIGURE 3. In assembly the tongue 10 is inserted into slot 12 so as to bring hole 11 as nearly as possible into alignment with holes 13 and 14 but because of the size and weight of the parts and the difficulty of their manipulation by remote controlled devices, it is not possible to obtain exact alignment of the holes. The hole 13 has a smooth conical bore and the hole 14 has an inner end portion 15 with a smooth conical bore which is an extension of the surface of the bore 13. Through most of its depth the hole 14 is counterbored to a slightly larger diameter and threaded as indicated at 16. The outer end of hole 14 is provided with a shallow annular recess 17 and the bottom of this recess contains a plurality of tapped screw holes 18. In the present embodiment the opposite walls of slot or channel 12 are flat and parallel, one wall being on the main body portion of part B and the other wall being on a flange portion 9. Although most of the length of tongue 10 is tapered, its base portion 8 has parallel walls which fit snugly in the slot 12.

The captive taper pin, which fits in the holes just described, is designated generally by the numeral 20. The captive taper pin comprises, essentially, a shaft 21, a bolt 22 and a tapered sleeve 23 having a conical exterior surface capable of fitting snugly in each of the holes 11, 13 and 15. The outer end of shaft 21 is equipped with a flange 30 at the base of a hexagonal projection 31. Projection 31 may be varied to suit various robot attachments. This driving connection may take the form of a polygonal socket instead of a projection, if desired. The inner end of the shaft has an enlarged screw threaded portion 32 adjacent to which is a tapered transverse hole 33 to receive the tapered lock pin 34.

The inner end of shaft 21 is internally bored and tapped at 35 to receive the reduced threaded end 36 of bolt 22. On the other end of bolt 22 is a slotted head 37. The threaded end of the bolt is locked in shaft 21 by means of a transverse hole 38 to receive the pin 34 whereby the shaft and bolt may be considered as an integral unit.

Sleeve 23 has a smooth internal cylindrical bore 40 slightly larger than the shank of bolt 22 so that the sleeve may wobble to some extent on the bolt before the parts are tightened. The large end of sleeve 23 adjacent to the end of shaft 21 has a convex spherically curved surface at 42 which fits a similarly curved concave surface 43 on a bushing 44. The small end of sleeve 23 contains a cylindrical recess 45 somewhat larger than the bolt head 37. Seated in this recess is a bushing 46 having a convex spherically curved surface 47 to fit the concave spherically curved surface 48 of bolt head 37. The spherically curved surfaces 42, 43, 47 and 48 have a common projected center on the axis of sleeve 23 midway between the surfaces 42 and 47.

The captive taper pin is retained in part B by a split ring 60 secured in recess 17 by screws 61. The inside diameter of ring 60 loosely fits shaft 21 to prevent withdrawal of the large threaded end 32 when the shaft is turned in a direction to unscrew it from the threaded bore portion 16. The inner end of shaft 21 does not bottom in the enlarged portion 16 of hole 14 but, instead, its inward movement is limited by the engagement of flange 30 with the outer surface of split ring 60 which serves as a stop for the whole taper pin assembly. The position of this stop may be adjusted by inserting an appropriate number of shims 62 under the split ring.

As many captive taper pins may be used as are necessary at intervals on part B to secure the parts A and B together. In bringing these parts together, the tapered tongue 10 guides itself into the slot 12 which serves as a socket and during this movement the parts are manipulated to register the hole 11 as nearly as possible with holes 13 and 14, the sleeve 23 having been retracted clear of slot 12 by rotating shaft 21 in the threaded bore 16. All that is necessary then to secure tongue 10 rigidly in the slot 12 is to rotate shaft 21 in the opposite direction to project sleeve 23 through the hole 11 and into the hole 13. Since the small end of sleeve 23 is considerably smaller than the entrance end of hole 11, a corresponding amount of misalignment is tolerable. If the sleeve 23 starts to bear against one side or the other of hole 11 as the sleeve travels axially, it will gradually shift the tongue to bring hole 11 into axial alignment. During this aligning movement, sleeve 23 is not required to rotate but merely slides axially through hole 11 with bolt 22 rotating within the sleeve.

In case the axis of hole 11 does not align itself on the common axis of holes 13 and 14, even after the parts are brought into register, the sleeve 23 may rock or cant on the spherical surfaces 43 and 48 to the extent necessary to make a tight fit between the sleeve and the three surfaces at 11, 13 and 15. The same automatic adjustment will also allow for manufacturing tolerance in the bore surfaces at 13 and 15. In order to facilitate such angular adjustment, a small amount of end float is allowed for sleeve 23 on the bolt 22. Lateral clearance space between the bolt and the bore of the sleeve is indicated at 70 and end clearance space is indicated at 71.

The relatively large diameter of the threaded portion 32 of shaft 21 permits the use of strong threads which will sustain high axial loading to force the sleeve into very tight engagement with the three different conical surfaces just mentioned. Such tight engagement and securement of the parts is obtained, however, without galling the surfaces by rotative friction and creating a binding action that would interfere with release of the pin. Ring 60 provides a positive stop against excessive tightening of the conical surfaces. The degree of tightening may be controlled as desired by shims 62.

When the apparatus is to be taken apart, reverse rotation of shaft 21 does not have to overcome rotating friction of the sleeve in the tapered bores but merely shifts the sleeve in rectilinear axial movement. It will be evident that the incipient stage of this loosening movement will immediately relieve the bind on the sleeve so that it can then be freely retracted clear of slot 12 for withdrawal of the tongue 10.

All that is required in the robot is a rotary chuck which can be moved into driving engagement with the outer end of shaft 21. There is no problem of starting screw threads into engagement because the threads at 32 and 16 are always meshed together and there is no problem of handling free pins because the present pin cannot be complteely withdrawn from the part B by the robot.

Having now described my invention and in what manner the same may be used, what I claim as new and desire to protect by Letters Patent is:

1. A taper pin comprising a bolt having a threaded portion and a smooth shank portion, a tapered sleeve mounted loosely on said shank for end float and lateral movement out of alignment with said bolt, and bushings on said bolt at opposite ends of said sleeve having spherical thrust bearing surfaces to limit said end float.

2. A taper pin comprising a bolt having a threaded portion, a head and a smooth shank therebetween, a tapered sleeve mounted loosely on said shank, a recess in the small end of said sleeve containing said bolt head, a bushing in said recess having a spherical bearing surface limiting axial movement of said sleeve toward said bolt head, and a bushing on said shank between said threaded portion of said bolt and the large end of said sleeve having a spherical bearing surface limiting axial movement of said sleeve toward said threaded portion.

3. A captive taper pin assembly comprising a shaft having screw threads on one end and a flange on the opposite end, a polygonal driving connection on said flange end for turning said shaft, a headed bolt mounted axially in the threaded end of said shaft, a tapered sleeve mounted loosely on said bolt, a recess in the small end of said sleeve containing the head of said bolt, a bushing in said recess having a spherical thrust bearing surface limiting axial movement of said sleeve toward said bolt head, and a bushing between the threaded end of said shaft and the large end of said sleeve having a spherical thrust bearing surface limiting axial movement of said sleeve toward said shaft.

References Cited in the file of this patent

UNITED STATES PATENTS

| 814,439 | Fraser | Mar. 6, 1906 |
| 1,382,758 | Brown | June 28, 1921 |
| 2,585,683 | Richardson | Feb. 12, 1952 |

FOREIGN PATENTS

| 709,266 | France | May 12, 1931 |